Patented Aug. 20, 1929.

1,725,087

UNITED STATES PATENT OFFICE.

LEOPOLD LASKA AND ARTHUR ZITSCHER, OF OFFENBACH-ON-THE-MAIN, GERMANY, ASSIGNORS TO GENERAL ANILINE WORKS, INC., OF NEW YORK, N. Y., A CORPORATION OF DELAWARE.

AZO DYESTUFFS DERIVED FROM 2.3-HYDROXYNAPHTHOYL-2-AMINO-3-NAPHTHOLETHERS.

No Drawing. Application filed December 16, 1927, Serial No. 240,634, and in Germany December 31, 1926.

Our invention relates to new azodyestuffs corresponding to the general formula:

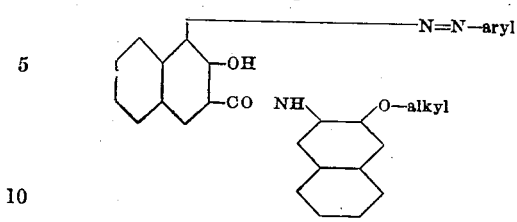

which are when dry reddish to blackish powders, soluble in concentrated sulfuric acid with a reddish-violet to green color, suitable for the production of valuable color lakes and yielding when produced on the vegetable fiber dyeings distinguished by a remarkable fastness to rubbing.

The new dyestuffs are obtainable by combining a diazo-, tetrazo- or diazoazocompound with a 2.3-hydroxynaphthoyl-2-amino-3-naphtholether.

The production of these dyestuffs on the fiber gives particularly valuable results the 2.3-hydroxynaphthoyl-2-amino-3-naphtholethers being distinguished by a special affinity to the vegetable fiber and a very good solubility. It is therefore possible to treat the padded dye-good prior to the development with a diazosolution with a rinsing solution, whereby an excellent fastness to rubbing of the dyed material is provided. The above mentioned good solubility of the 2.3-hydroxynaphthoyl-2-amino-3-naphtholethers enables the dyer to use strongly concentrated stocksolutions for dyeing in the standing bath, which process is an absolute commercial necessity. The 2.3-hydroxynaphthoyl-2-amino-3-naphtholethers are distinguished by the further advantage that the padding liquor does not need an addition of formaldehyde, the hanks, which are impregnated with the 2.3-hydroxynaphthoyl - 2 - amino - 3 - naphtholethers, being resistant to the air without this addition. In consequence thereof the stocksolutions are stable without any limit. All these advantages make the 2.3-hydroxynaphthoyl-2-amino-3-naphtholethers especially suitable for the dyeing process in a standing bath.

They are unknown hitherto and may be prepared for instance according to the process described in U. S. Patent No. 1,101,111. The 2.3-hydroxynaphthoyl-2-amino-3-naphtholmethylether crystallizes from toluene in the form of feebly colored needles, melting at 197–198°.

In order to further illustrate our invention the following examples are given the parts being by weight and all temperatures in centigrade degrees. But we wish it to be understood that we are not limited to the particular conditions nor specific products mentioned therein.

*Example 1.*—A diazosolution prepared in the usual manner from 17,5 parts of 4-nitro-2-amino-1-anisole, is combined with a solution in dilute caustic soda solution of 25 parts of 2.3-hydroxynaphthoyl-2-amino-3-naphtholmethylether, containing a sufficient amount of sodium acetate for neutralizing the excess of mineral acid. The separated dyestuff corresponding probably to the formula:

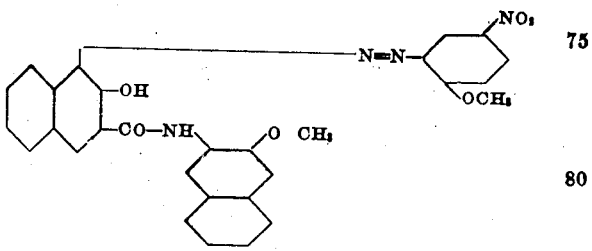

is filtered off and well washed. It dissolves in concentrated sulfuric acid with a reddish-violet color. It may be advantageously used in form of a paste and yields, when mixed with the usual substrata, a bluish red color lake of a good fastness.

In order to produce the dyestuff on the fiber one may proceed as follows:

Well boiled and dried cotton yarn is handled for about half-an-hour in a solution, containing 2,5 grs of 2.3-hydroxynaphthoyl-2-amino-3-naphtholmethylether, 6 cc. of a caustic soda solution of 34° Bé. and 5 cc. of Turkey red oil in the liter, well wrung out and centrifugated. It is developed with a diazosolution containing 1,75 grs. of 4-nitro-1.2-anisidine in the liter and being neutralized with sodium acetate, rinsed, soaped and dried.

In this manner a clear bluish red dyeing of a Turkey red shade is obtained.

*Example 2.*—For dyeing in a standing bath 200 grs. of 2-3-hydroxynaphthoyl-2-amino-3-naphtholmethylether, 500 cc. of a caustic soda solution of 34° Bé., and 400 cc. of Turkey red oil are dissovled to 10 liters of a stock-solution.

For one dyeing operation 1 part of this stock-solution is diluted with 7 parts of water and the dye-good is padded as described in example 1 the proportion of material to be dyed to the liquor being 1:20. When developing in the usual manner with a diazosolution of 5-chloro-2-amino-1-toluene, which is additioned of a basic aluminium sulfate solution for neutralizing the excess of mineral acid, a clear bluish red dyeing of a very good fastness to kier boiling is obtained.

For further lots the bath is replenished with 1 liter of the aforesaid stock solution pro 1 kg. of dry material.

The padding operation may be carried out in the same manner with addition of formaldehyde.

In the following table the shades of some further dyestuffs, produced on the fiber, are given:

2.3-hydroxynaphthoyl-2.3-aminonaphtholmethylether yields, when developed with the diazocompound of:

| | Shade. |
|---|---|
| 4-amino-1.3-dimethylbenzene | Full red. |
| 4-chloroaniline | Yellowish scarlet. |
| 5-bromo-2-amino-1-methylbenzene | Bluish red. |
| 2-amino-5-chlorophenyl-β-naphthylether | Clear red. |
| 4-amino-3-chloro-benzanilide | Yellowish red. |
| 2.5-dichloroaniline | Yellowish red. |
| 2.5-dibromoaniline | Yellowish red. |
| 2-amino-5.2′.5′-trichlorodiphenylether | Clear red. |
| 2.3-dichloroaniline | Reddish orange. |
| 2.3.4-trichloroaniline | Yellowish red. |
| 3-nitro-4-amino-1-methylbenzene | Claret red. |
| 2-chloro-5-nitro-aniline | Yellowish red. |
| 5-chloro-2-nitroaniline | Yellowish red. |
| 3-amino-4-nitro-6-methoxy-1-methylbenzene | Bluish garnet. |
| o-aminoazotoluene | Garnet. |
| 4-amino-2.5′-dichloro-5.2′-dimethoxyazobenzene | Dark violet. |
| 4′-nitro-4-aminoazobenzene | Bluish garnet. |
| 1.5-diamino-anthraquinone | Clear violet. |

2.3-hydroxynaphthoyl-2.3-aminonaphtholethylether yields, when developed with the diazocompound of:

| | |
|---|---|
| 2-chloro-4-nitroaniline | Yellowish red. |
| 5-nitro-2-amino-1-methylbenzene | Red. |
| 1-amino-anthraquinone | Yellowish red. |

The new dyestuffs may be also produced by the printing process according to the usual methods.

With other corresponding 2.3-hydroxynaphthoyl-2-amino-3-naphtholethers and other diazo-, tetrazo- or diazoazocompounds the process may be effected in the same manner.

We claim:

1. As new compounds azodyestuffs, corresponding probably to the general formula:

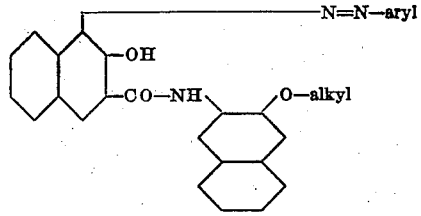

which are when dry reddish to blackish powders, soluble in concentrated sulfuric acid with a reddish violet to green color, being suitable for the production of valuble color lakes and yielding, when produced on the vegetable fiber, dyeings of a remarkable fastness to rubbing.

2. Process for manufacturing new azodyestuffs which process comprises combining any aromatic diazocompound with a 2.3-hydroxynaphthoyl-2-amino-3-naphtholether.

3. Textile material dyed with the dyestuffs as claimed in claim 1, said dyestuffs being produced on the vegetable fiber.

4. As new compounds azodyestuffs, corresponding probably to the general formula:

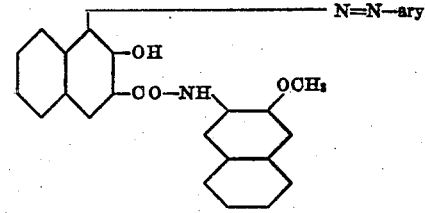

which are when dry reddish to blackish powders, soluble in concentrated sulfuric acid with a reddish violet to green color, being suitable for the production of valuable color lakes and yielding, when produced on the vegetable fiber, dyeings of a remarkable fastness to rubbing.

5. Process for manufacturing new azodyestuffs which process comprises combining any aromatic diazocompound with 2.3-hydroxynaphthoyl-2-amino-3-naphtholmethylether.

6. Textile material dyed with the dyestuffs as claimed in claim 4, said dyestuffs being produced on the vegetable fiber.

7. As new compounds azodyestuffs corresponding to the probable formula:

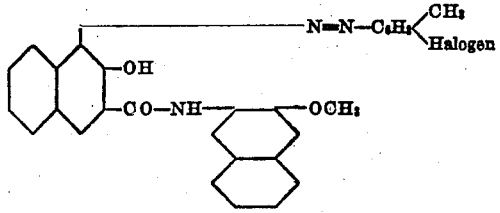

which are when dry reddish powders, soluble in concentrated sulfuric acid with a reddish violet to green color, being suitable for the production of valuable color lakes and yielding when produced on the vegetable fiber red dyeings of a remarkable fastness to rubbing.

8. Textile material dyed with the dyestuffs as claimed in claim 7, said dyestuffs being produced on the vegetable fiber.

9. As new compound azodyestuffs corresponding to the probable formula:

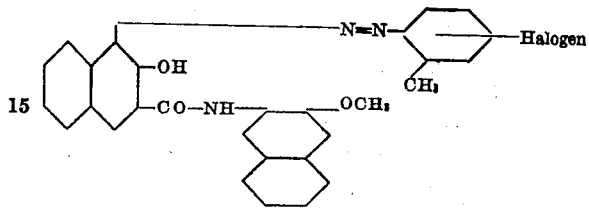

which are when dry reddish powders, soluble in concentrated sulfuric acid with a reddish violet to green color, being suitable for the production of valuable color lakes and yielding when produced on the vegetable fiber red dyeings of a remarkable fastness to rubbing.

10. Textile material dyed with the dyestuffs as claimed in claim 9, said dyestuffs being produced on the vegetable fiber.

11. As a new compound the azodyestuff corresponding to the probable formula:

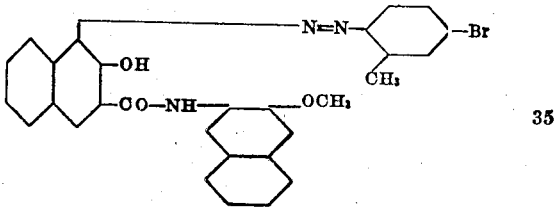

which is when dry a reddish powder, soluble in concentrated sulfuric acid with a reddish violet color, being suitable for the production of valuable color lakes and yielding when produced on the vegetable fiber bluish red dyeings of a remarkable fastness to rubbing.

12. Textile material dyed with the dyestuff as claimed in claim 11, said dyestuff being produced on the vegetable fiber.

In testimony whereof, we affix our signatures.

LEOPOLD LASKA.
ARTHUR ZITSCHER.